US008692841B2

(12) United States Patent
Botzas

(10) Patent No.: US 8,692,841 B2
(45) Date of Patent: Apr. 8, 2014

(54) METHODS FOR MODIFYING COLOR DATA AND DISPLAY SYSTEMS IMPLEMENTING THE METHODS

(75) Inventor: Anthony Botzas, San Jose, CA (US)

(73) Assignee: Samsung Display Co., Ltd. (KR)

( * ) Notice: Subject to any disclaimer, the term of this patent is extended or adjusted under 35 U.S.C. 154(b) by 304 days.

(21) Appl. No.: 13/315,819

(22) Filed: Dec. 9, 2011

(65) Prior Publication Data

US 2013/0147824 A1 Jun. 13, 2013

(51) Int. Cl.

| | |
|---|---|
| *G09G 5/00* | (2006.01) |
| *G09G 5/02* | (2006.01) |
| *G06F 15/00* | (2006.01) |

(52) U.S. Cl.

USPC ........... 345/589; 345/605; 345/581; 345/582; 345/583; 345/697; 358/1.9

(58) Field of Classification Search

USPC ........................................................ 345/605

See application file for complete search history.

(56) References Cited

U.S. PATENT DOCUMENTS

| | | | | |
|---|---|---|---|---|
| 5,608,864 | A * | 3/1997 | Bindlish et al. | 345/558 |
| 2004/0104923 | A1* | 6/2004 | Koyama | 345/697 |
| 2008/0266310 | A1* | 10/2008 | Chalmers et al. | 345/589 |

* cited by examiner

*Primary Examiner* — Aaron M Richer
*Assistant Examiner* — Saptarshi Mazumder
(74) *Attorney, Agent, or Firm* — Innovation Counsel LLP

(57) ABSTRACT

A method for modifying color data in a display system is implemented using hardware circuitry. The method includes receiving first-color data associated with a first bit depth, the first-color data including a first-color data value. The method also includes receiving second-color data associated with a second bit depth that is less than the first bit depth, the second-color data including a second-color data value that corresponds to the first-color data value. The method also includes normalizing the second-color data according to the first bit depth for generating normalized second-color data. The method also includes adding an offset value to each data value of the normalized second-color data to generate offset second-color data, the offset second-color data including an offset second-color data value that corresponds to the first-color data value. The method also includes determining a modified second-color data value using the first-color data value and the offset second-color data value.

20 Claims, 5 Drawing Sheets

METHODS FOR MODIFYING COLOR DATA AND DISPLAY SYSTEMS IMPLEMENTING THE METHODS

BACKGROUND OF THE INVENTION

The present invention is related to methods for modifying color data in display systems. More particularly, the present invention is related to methods for modifying color data to reduce the amount or occurrence of conspicuous chromatic artifacts in images displayed using display systems. The present invention is also related to display systems that implement the methods.

Presently, color formats that utilize relatively low bit depths (or color depths) may be employed in display systems (such as display systems of mobile devices) that need to minimize image data sizes. For example, the RGB565 color format is a well-known 16-bit color format that may enable display systems to satisfy image data size requirements. Nevertheless, given that the RGB565 color format uses lower bit depths for each of red-color data and blue-color data than for green-color data, red-color data values and blue-color data values may not desirably match green-color data values as needed. As a result, display systems that implement the RGB565 color format may display images showing noticeable chromatic artifacts such that the image quality of the images may be undesirable.

Other color formats that use different depths for different color data also may cause similar problems of noticeable chromatic artifacts in displayed images.

SUMMARY

An embodiment of the present invention is related to a method for modifying color data in a display system, for minimizing the amount of noticeable chromatic artifacts in an image. The method may be implemented using hardware circuitry. The method may include receiving first-color data associated with a first bit depth, the first-color data including a first-color data value. The method may also include receiving second-color data associated with a second bit depth, the second-color data including a second-color data value that corresponds to the first-color data value, the second bit depth being less than the first bit depth. The method may also include normalizing the second-color data according to the first bit depth for generating normalized second-color data. The method may also include adding a first offset value to each data value of the normalized second-color data to generate offset second-color data, the offset second-color data including an offset second-color data value that corresponds to the first-color data value and the second-color data value. The method may also include determining a modified second-color data value using the first-color data value and the offset second-color data value. The method may also include providing the first-color data value and the modified second-color data value to a display module for displaying the image.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
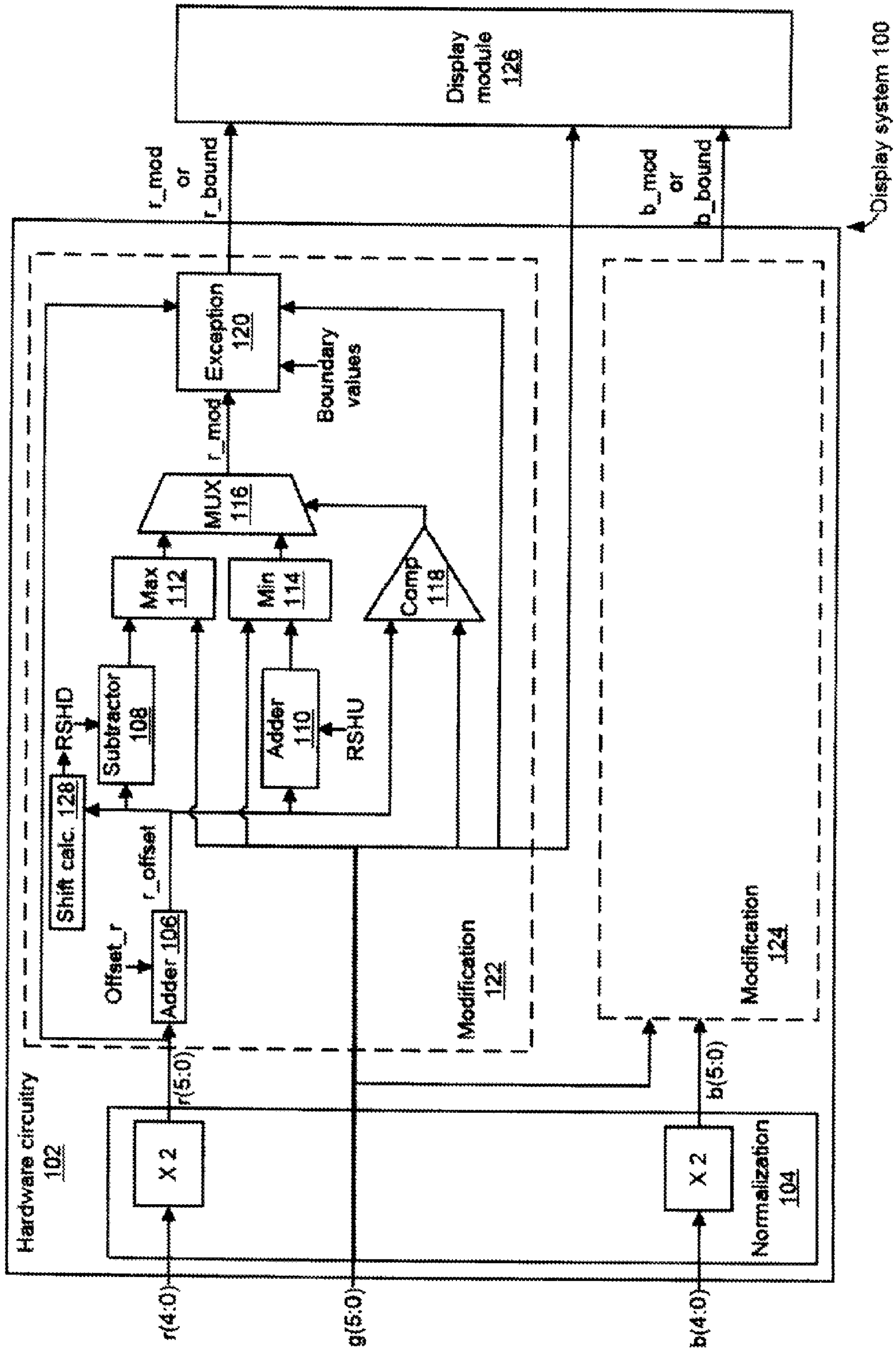
FIG. 1 shows a schematic block diagram illustrating a display system in accordance with one or more embodiments of the present invention.

The present invention will now be described in detail with reference to a few embodiments thereof as illustrated in the accompanying drawings. In the following description, numerous specific details are set forth in order to provide thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits adapted for the various operations pertaining to embodiments of the invention.

One or more embodiments of the present invention are related to a method for modifying color data in a display system, for reducing the amount of noticeable chromatic artifacts in a displayed image. The method may be implemented using a set of hardware circuitry. The method may include receiving, using the hardware circuitry, first-color data (e.g., green-color data) associated with a first bit depth, the first-color data including a first-color data value. The method may also include receiving, using the hardware circuitry, second-color data (e.g., red-color data) associated with a second bit depth, the second-color data including a second-color data value that corresponds to the first-color data value, the second bit depth being less than the first bit depth. The method may also include normalizing, using the hardware circuitry, the second-color data according to the first bit depth for generating normalized second-color data. The method may also include adding, using the hardware circuitry, a first offset value to each data value of the normalized second-color data to generate offset second-color data, the offset second-color data including an offset second-color data value that corresponds to the first-color data value and the second-color data value. The method may also include determining a modified second-color data value using the hardware circuitry, the first-color data value, and the offset second-color data value. The method may also include providing the first-color data value and the modified second-color data value for displaying an image.

In one or more embodiments, the method may also include comparing the offset second-color data value with the first-color data value. The method may further include setting the modified second-color data value equal to a maximum value of the first-color data value and a first adjusted second-color data value (i.e., the larger value of the two values if the two values are not equal or either one of the two values if the two values are equal) if the offset second-color data value is greater than the first-color data value, the first adjusted second-color data value being equal to the offset second-color data value minus a first shift value. The method may further include setting the modified second-color data value equal to a minimum value of the first-color data value and a second adjusted second-color data value (i.e., the smaller value of the two values if the two values are not equal or either one of the two values if the two values are equal) if the offset second-color data value is not greater than the first-color data value, the second adjusted second-color data value being equal to the offset second-color data value plus a second shift value.

In one or more embodiments, the method may include determining, using the hardware circuitry, the first shift value based on the offset second-color data value.

In one or more embodiments, the method may include setting, using the hardware circuitry, the first shift value equal to a first amount if the offset second-color data value equals to a first offset second-color data value; the method may further include setting, using the hardware circuitry, the first shift value equal to a second amount if the offset second-color data value equals to a second offset second-color data value. The first offset second-color data value is greater than the second offset second-color data value, and the first amount is less than the second amount. In other words, a relatively high shift value may be used if the offset second-color data value is relatively low.

In one or more embodiments, the method may include setting, using the hardware circuitry, the first shift value equal to a first amount if the offset second-color data value is greater than an threshold; the method may further include setting, using the hardware circuitry, the first shift value equal to a second amount if the offset second-color data value is not greater than the threshold, wherein the first amount is less than the second amount.

In one or more embodiments, the method may include implementing, using the hardware circuitry, the first shift value as a function of the offset second-color data value, wherein the first shift value is inversely proportional to the offset second-color data value.

In one or more embodiments, the method may include determining, using the hardware circuitry, the first shift value before generating the offset second-color data value. The first shift value may be predetermined based on experience and/or gradient test patterns.

In one or more embodiments, the second shift value may be determined using a method analogous to the method employed for determining the first shift value.

In one or more embodiments, the method may include setting, using the hardware circuitry, the first shift value equal to the second shift value.

In one or more embodiments, the method may further include receiving, using the hardware circuitry, third-color data (e.g., blue-color data) associated with a third bit depth, the third-color data including a third-color data value that corresponds to the first-color data value and the second-color data value, the third bit depth being less than the first bit depth. The method may also include normalizing, using the hardware circuitry, the third-color data according to the first bit depth for generating normalized third-color data. The method may also include adding, using the hardware circuitry, a second offset value to each data value of the normalized third-color data to generate offset third-color data, the offset third-color data including an offset third-color data value that corresponds to the first-color data value and the third-color data value. The method may also include determining a modified third-color data value using the hardware circuitry, the first-color data value, and the offset third-color data value. The method may also include further providing the modified third-color data value for displaying the image.

In one or more embodiments, the method may further include comparing, using the hardware circuitry, the offset third-color data value with the first-color data value. The method may further include setting, using the hardware circuitry, the modified third-color data value equal to a maximum value of the first-color data value and a first adjusted second-color data value if the offset third-color data value is greater than the first-color data value, the first adjusted third-color data value being equal to the offset third-color data value minus a third shift value. The method may further include setting, using the hardware circuitry, the modified third-color data value equal to a minimum value of the first-color data value and a third adjusted second-color data value if the offset second-color data value is not greater than the first-color data value, the second adjusted third-color data value being equal to the offset third-color data value plus a fourth shift value.

In one or more embodiments, the method may include setting, using the hardware circuitry, the third shift value equal to the first shift value.

In one or more embodiments, the method may include determining, using the hardware circuitry, the third shift value based on the offset third-color data value such that the third shift value is not equal to the first shift value.

In one or more embodiments, the first-color data further includes a second first-color data value, the second-color data further includes a second second-color data value corresponding to the second first-color data value. The method may determining a boundary second-color data value using the hardware circuitry, the second first-color data value and the second second-color data value; the method may further include providing the second first-color data value and the boundary second-color data value for displaying the image.

In one or more embodiments, the method may further include setting, using the hardware circuitry, the boundary second-color data value equal to 0 if the second second-color data value equals to 0 and if the second first-color data value equals to 0 or an upper-limit value for the second first-color data value; the method may further include setting, using the hardware circuitry, the boundary second-color data value equal to the upper-limit value for the second first-color data value if the second second-color data value equals to an upper-limit normalized value for the second second-color data value and if the second first-color data value equals to 0 or the upper-limit value for the second first-color data value. The upper-limit normalized value for the second second-color data value is less than the upper-limit value for the second first-color data value.

In one or more embodiments, the method may include setting, using the hardware circuitry, the first offset value equal to 2 times a difference between the first bit depth (i.e., the target bit depth) and the second bit depth (i.e., the pre-normalization bit-depth), i.e., 2*(the first bit depth−the second bit depth).

In one or more embodiments, the method may include normalizing, using the hardware circuitry, input first-color data according to the first bit depth for generating the first-color data, the input first-color data being associated with a third bit depth that is less than the first bit depth. The first bit depth may be required according to a particular display system design.

In one or more embodiments, the third bit depth is equal to the second bit depth.

In one or more embodiments, the third bit depth is not equal to the second bit depth.

One or more embodiments of the invention are related to a display system that includes a set of hardware circuitry and a display module. The hardware circuitry includes logic for receiving first-color data associated with a first bit depth, the first-color data including a first-color data value. The hardware circuitry also includes logic for receiving second-color data associated with a second bit depth, the second-color data including a second-color data value that corresponds to the first-color data value, the second bit depth being less than the first bit depth. The hardware circuitry also includes logic for normalizing the second-color data according to the first bit depth for generating normalized second-color data. The hardware circuitry also includes logic for adding a first offset value to each data value of the normalized second-color data to generate offset second-color data, the offset second-color data including an offset second-color data value that corresponds to the first-color data value and the second-color data value. The hardware circuitry also includes logic for determining a modified second-color data value using the first-color data value, and the offset second-color data value. The display module displays an image using the first-color data value and the modified second-color data value.

According to embodiments of the invention, whenever offset second-color data values or offset third-color data values (which represent relatively-low-bit-depth color data) are sufficiently close to the first-color data values (which represent relatively-high-bit-depth color data), the offset second-color data values or offset third-color data values are shifted to be locked with the first-color data values, such that color data values for the three colors may be substantially equal, resulting in grey color. Since grey color is generally less conspicuous than other colors that might have been displayed, embodiments of the invention may reduce the amount of conspicuous chromatic artifacts. Advantageously, embodiments of the invention may provide desirable image quality while satisfying image data size constraints.

The features and advantages of the present invention may be better understood with reference to the figures and discussions that follow.

FIG. 1 shows a schematic block diagram illustrating a display system 100 in accordance with one or more embodiments of the present invention. Display system 100 may include a set of hardware circuitry 102 for modifying color data received from an external source or received from one or more other components of display system 100. Display system 100 may also include a display module 126 for displaying images using color data values provided by hardware circuitry 102.

Hardware circuitry 102 may be implemented using, for example, a field-programmable gate array (FPGA). Hardware circuitry 102 may include normalization logic 104 for normalizing color data, modification logic 122 for modifying normalized color data associated with a certain color (e.g., red color), and modification logic 124 for modifying normalized color data associated with another color (e.g., blue color). Modification logic 122 may include an adder 106, a shift value calculator 128, a subtractor 108, an adder 110, maximum value logic 112, minimum value logic 114, a comparator 118, a multiplexer 226, and exception logic 120. Modification logic 124 may include components analogous to one or more components included in modification logic 122. Features of components of hardware circuitry 102 are further discussed with reference to the examples of FIGS. 2-5. In the discussion with reference to FIGS. 1-5, bit depths of 5, 6, and 5 for red-color data, green-color data, and blue-color data, respectively, are used for discussing illustrative examples. Embodiments of the invention are applicable to other color formats having other bit depth arrangements.

Figure 2:
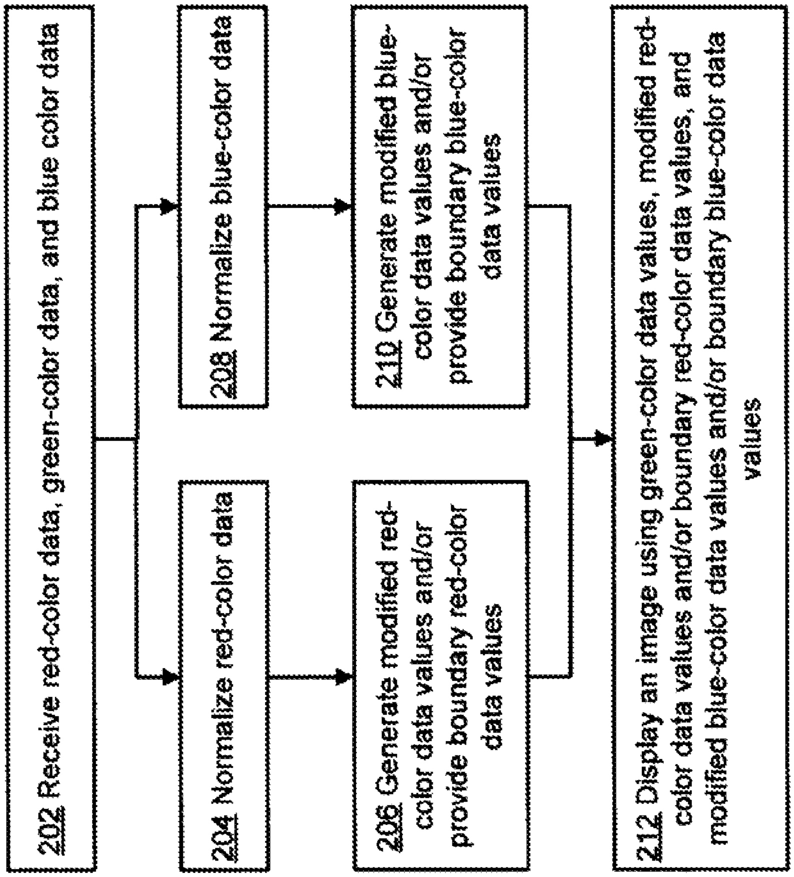
FIG. 2 shows a flow chart illustrating a method for modifying color data in accordance with one or more embodiments of the present invention.

FIG. 2 shows a flow chart illustrating a method for modifying color data in accordance with one or more embodiments of the present invention. The method may be implemented using display system 100, including hardware circuit 102 and display module 126, illustrated in the example of FIG. 1.

In step 202, hardware circuit 102 may receive red-color data, green-color data, and blue color data, which may be, for example, 5-bit, 6-bit, and 5-bit, respectively.

In step 204, normalization logic 104 may normalize the red-color data according to the 6-bit bit depth, the highest bit depth of the received color data. Since the data is binary and the difference between the highest bit depth and the bit depth of the red-color data is 1 bit, normalization logic 104 may multiply the red-color data by 2 to normalize the red-color data to generate 6-bit normalized red-color data. For example, a 5-bit red-color data value r(4:0) is multiplied by 2 to generate a corresponding substantially 6-bit normalized red-color data value r(5:0).

The 6-bit green-color data may include data values of one or more of 0, 1, 2, 3, . . . , 61, 62, and 63. The normalized red-color data may include data values of one or more of 0, 2, 4, 6, . . . , 58, 60, and 62. The normalized red-color data may have approximately the same range as the range of the green-color data.

Figure 4A:
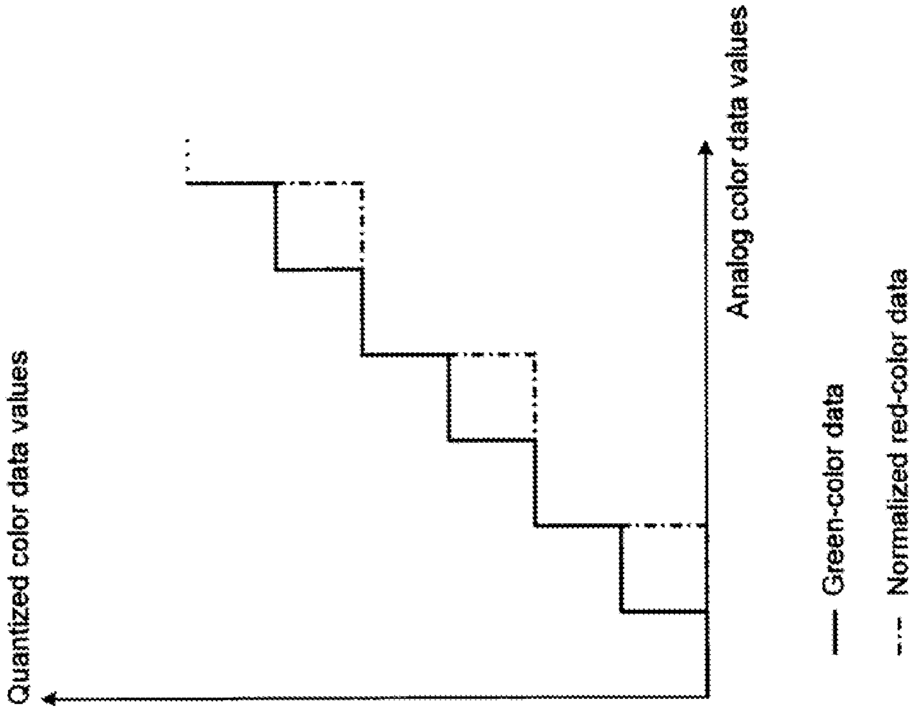
FIG. 4A shows a schematic diagram illustrating a portion of possible green-color data and a portion of possible normalized red-color data in accordance with one or more embodiments of the present invention.

FIG. 4A shows a schematic diagram illustrating a portion of possible green-color data and a portion of possible normalized red-color data in accordance with one or more embodiments of the present invention. As illustrated in the example of FIG. 4A, the possible normalized red-color data may have about one half of the granularity of the possible green-color data.

In one or more embodiments, normalization logic 104 may normalize color data by multiplying color data values by 2^(target bit depth−pre-normalization bit depth). For example, given that the target bit depth is 6 bit, if the bit depth of the red-color data is 4 bit, then normalization logic 104 may multiply the red-color data by 2̂(6−4)=4 to normalize the red-color data to generate substantially 6-bit normalized red-color data.

In step 206, modification logic 122 may use the 6-bit normalized red-color data and the 6-bit green-color data to generate modified red-color data values and/or to provide boundary red-color data values. The operation of modification logic 122 is further discussed with reference to the example of FIG. 3.

Analogous to the operation in step 204, in step 208, normalization logic 104 may normalize the 5-bit blue-color data, e.g., a 5-bit blue-color data value b(4:0), according to the 6-bit bit depth to generate 6-bit normalized blue-color data, e.g., a 6-bit normalized blue-color data value b(5:0) corresponding to b(4:0). Analogous to the operation in step 206, in step 210, modification logic 124 may use the 6-bit normalized blue-color data and the 6-bit green-color data to generate modified blue-color data values and/or to provide boundary blue-color data values.

In step 212, display module 126 may display an image using green-color data values of the green-color data, the modified red-color data values and/or the boundary red-color data values, and the modified blue-color data values and/or the boundary blue-color data values provided by hardware circuitry 102.

Figure 3:
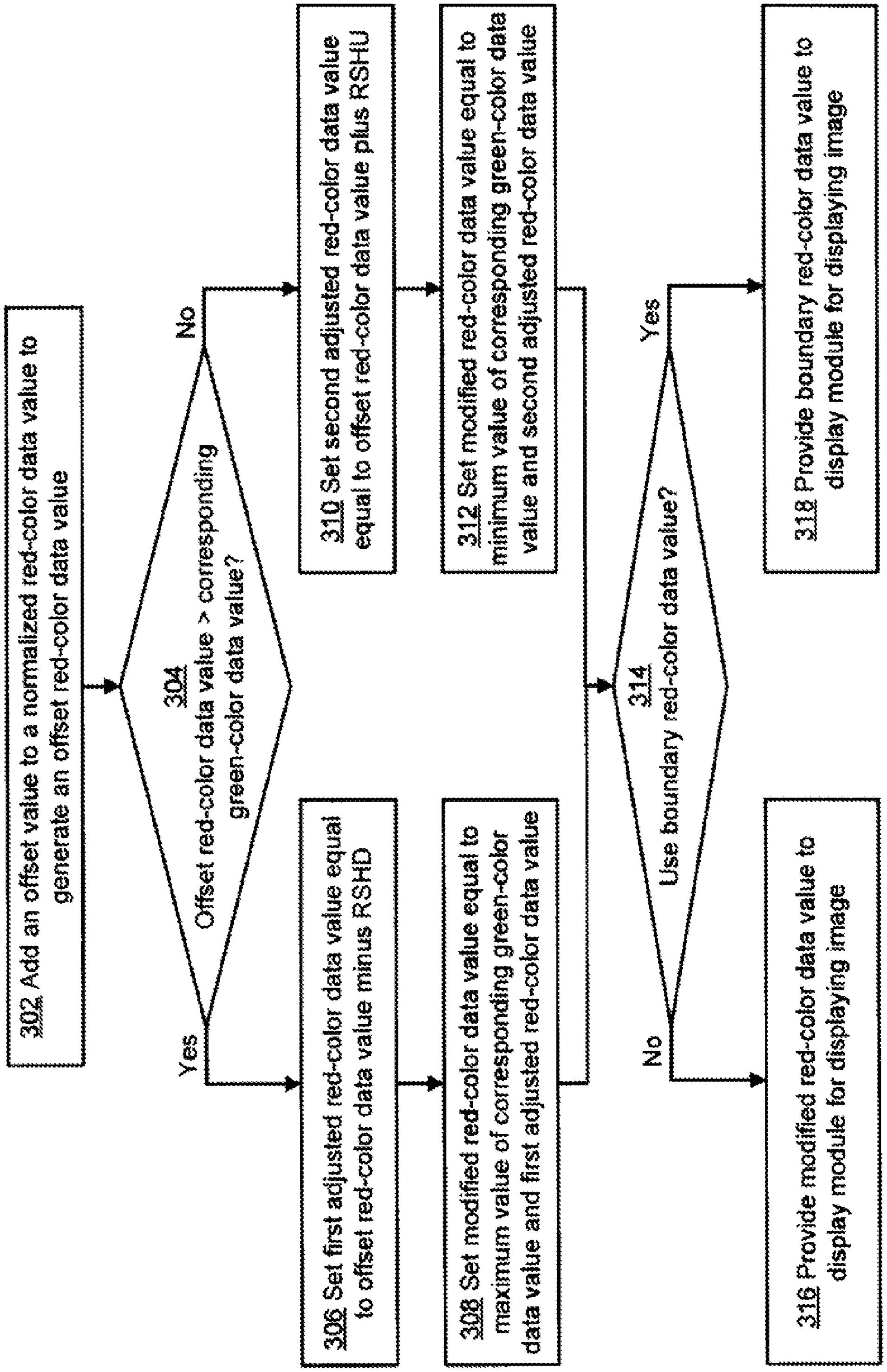
FIG. 3 shows a flow chart illustrating a method for modifying normalized red-color data in accordance with one or more embodiments of the present invention.

FIG. 3 shows a flow chart illustrating a method for modifying normalized red-color data in accordance with one or more embodiments of the present invention. The method is discussed using a normalized red-color data value, e.g., r(5:0), in the normalized red-color data as an example; the method is applicable to other normalized red-color data values in the normalized red-color data. The normalized red-color data value r(5:0) corresponds to the red-color data value r(4:0) and the green-color data value g(5:0). The method may be implemented using modification logic 122 illustrated in the example of FIG. 1. The sequence of some steps illustrated in the example of FIG. 3 may be altered in one or more embodiments. The operation of modification logic 124 may be analogous to the operation of modification logic 122, though parameter values used by modification logic 124 may or may not equal to parameter values used by modification logic 122.

In step 302, adder 106 may add an offset value Offset_r to each of the normalized red-color data values in the normalized red-color data for generating offset red-color data that is substantially centered with the green-color data.

Figure 4B:
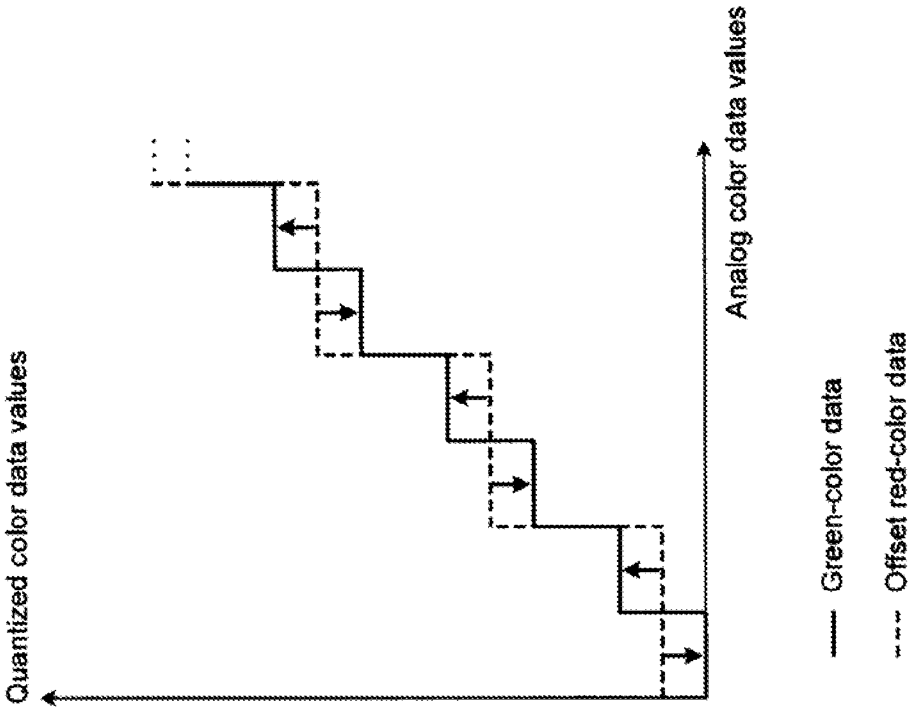
FIG. 4B shows a schematic diagram illustrating a portion of possible green-color data and a portion of possible offset red-color data in accordance with one or more embodiments of the present invention.

FIG. 4B shows a schematic diagram illustrating a portion of possible green-color data and a portion of possible offset red-color data in accordance with one or more embodiments of the present invention. In contrast with the possible normalized red-color data illustrated in the example of FIG. 4A, the possible offset red-color data illustrated in the example of FIG. 4B is substantially centered with respect to the distribution of the possible green-color data, for facilitating tuning offset red-color data values toward corresponding green-color data values when the offset red-color data values are sufficiently close to the corresponding green-color data values, in order to generate grey color for minimizing the occurrence of noticeable chromatic artifacts in displayed images.

As an example, adder 106 may add the offset value Offset_r to the normalized red-color data value r(5:0) to generate an offset red-color data value r_offset, which also is substantially 6-bit, in step 302.

In step 304, comparator 228 may compare the offset second-color data value r_offset with the corresponding green-color data value g(5:0). If the offset second-color data value r_offset is greater than the green-color data value g(5:0), control may be transferred to step 306; otherwise, control may be transferred to step 310. In one or more embodiments, if the offset second-color data value r_offset is greater than or equal to the green-color data value g(5:0), control may be transferred to step 306; otherwise, control may be transferred to step 310.

In step 306, subtractor 208 may set a first adjusted red-color data value equal to the offset red-color data value r_offset minus a first shift value, or a red-shift-down value RSHD.

In one or more embodiments, the first adjusted red-color data value may be determined before step 304 or simultaneously with step 304.

In one or more embodiments, the first shift value may be predetermined based on experience and/or gradient test patterns.

In one or more embodiments, shift value calculator 128 may determine the first shift value before the offset red-color data value r_offset is generated.

In one or more embodiments, shift value calculator 128 may determine the first shift value based on the offset red-color data value r_offset.

In one or more embodiments, shift value calculator 128 may set a relatively high value for the first shift value if the offset red-color data value r_offset is relatively low, i.e., the color in the image is relatively dark. As a result, grey color may be more likely to be generated, and the likelihood of the occurrence of noticeable chromatic artifacts may be reduced.

In one or more embodiments, shift value calculator 128 may set the first shift value equal to a first amount if the offset red-color data value r_offset is greater than a threshold, and shift value calculator 128 may set the first shift value equal to a second amount if the offset red-color data value r_offset is not greater than the threshold, wherein the first amount is less than the second amount. For example, if r_offset is greater than 32 (relatively bright), shift value calculator 128 may set the first shift value equal to 2; if r_offset is not greater than 32 (relatively dark), shift value calculator 128 may set the first shift value equal to 4. In one or more embodiments, if the offset red-color data value r_offset is greater than or equal to a threshold, shift value calculator 128 may set the first shift value equal to a first amount; otherwise, shift value calculator 128 may set the first shift value equal to a second amount, wherein the first amount is less than the second amount.

In one or more embodiments, shift value calculator 128 may implement the first shift value as a function of the offset red-color data value r_offset, wherein the first shift value is inversely proportional to the offset red-color data value r_offset according to the function.

In step 308, maximum value logic may set a modified red-color data value r_mod equal to the maximum value of the corresponding green-color data value g(5:0) and the first adjusted second-color data value; the modified red-color data value r_mod is set equal to the larger value of the two values if the two values are not equal or either one of the two values if the two values are equal. Step 308 prevents the modified red-color data value from "overshooting" the corresponding green-color data value g(5:0), thereby preventing undesirably creating additional noticeable chromatic artifacts in the displayed image.

In step 310, adder 110 may set a second adjusted red-color data value equal to the offset second-color data value r_offset plus a second shift value, or a red-shift-up value RSHU. The process and/or mechanism for determining the second shift value RSHU may be analogous to the process of determining the first shift value RSHD. In one or more embodiments, hardware circuitry 102 may set the second shift value equal to the first shift value.

In step 312, minimum value logic 114 may set the modified red-color data value r_mod equal to the minimum value of the corresponding green-color data value g(5:0) and the second adjusted second-color data value; the modified red-color data value r_mod is set equal to the smaller value of the two values if the two values are not equal or either one of the two values if the two values are equal. Analogous to step 308, step 312 also prevents the modified red-color data value from “overshooting” the corresponding green-color data value g(5:0), thereby preventing creating additional noticeable chromatic artifacts in the displayed image.

In step 314, exception logic 120 may determine whether display module 126 should use a boundary red-color data value r_bound, instead of the modified red-color data value r_mod, for example, in order to satisfy data range requirements in particular display system configurations and/or to ensure that the red-color data value used for displaying the image is equal to the green-color data value used for displaying the image. If display module 126 does not need to use a boundary red-color data value, control is transferred to step 316; otherwise, control is transferred to step 318. The determination of whether to use the boundary red-color data value is further discussed with reference to the example of FIG. 5.

In step 316, exception module 120 may provide the modified red-color data value r_mod to display module 126 for displaying an image.

In step 318, exception module 120 may provide the boundary red-color data value r_bound to display module 126 for displaying the image. The boundary red-color data value r_bound is further discussed with reference to the example of FIG. 5.

Modification logic 124 may process the normalized blue-color data b(5:0) with steps analogous to steps illustrated in the example of FIG. 3.

In one or more embodiments, if the bit depth of the blue-color data is different from the bit depth of the red-color data, depending on the bit depth of the blue color data, the offset value added to each normalized blue-color data value in the normalized blue-color data is different from the offset value Offset_r added used in step 302.

In one or more embodiments, depending on, for example, gradient test patterns related to the blue-color data, the shift values used for determining the adjusted blue-color data values may or may not be equal to the shift values used in steps 306 and 310.

Figure 5:
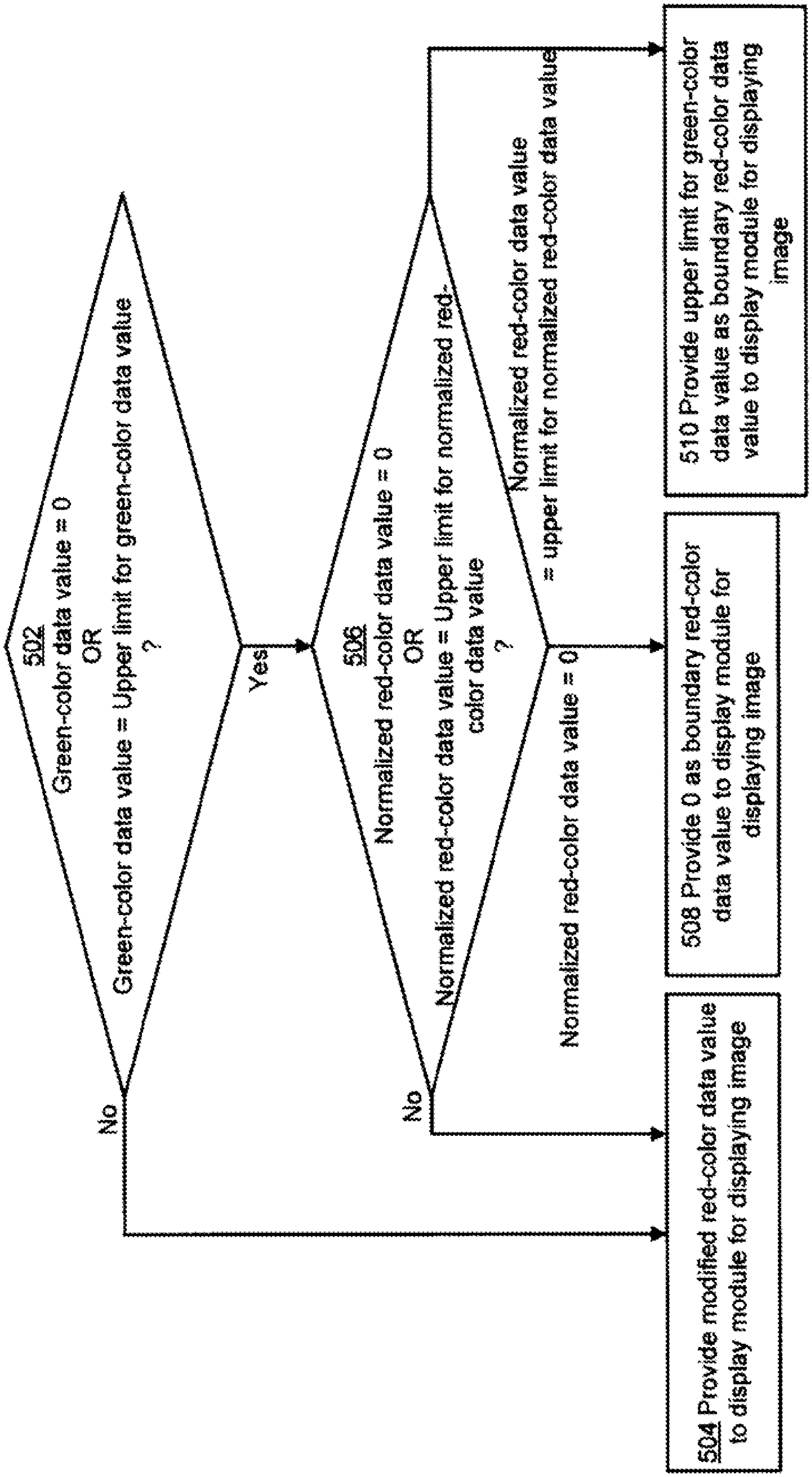
FIG. 5 shows a flow chart illustrating a method for providing a least one of a modified red-color data value and a boundary red-color data value in accordance with one or more embodiments of the present invention.

FIG. 5 shows a flow chart illustrating a method for providing at least one of the modified red-color data value r_mod and the boundary red-color data value r_bound in accordance with one or more embodiments of the present invention. The steps illustrated in the example of FIG. 5 may be primarily performed by exception logic 120 of modification logic 122 illustrated in the example of FIG. 1. Modification 124 also may include exception logic performing analogous steps for providing modified blue-color data values (e.g., b_mod) and/or boundary blue-color data values (e.g., b_bound) to display module 126. In one or more embodiments, the sequence of some of the steps illustrated in FIG. 5 may be altered.

In step 502, exception logic 102 may determine whether the green-color data value g(5:0) corresponding to the modified red-color data value r_mod is equal to one of 0 and the upper-limit value for the green-color data value. Given that the green-color data is 6-bit, the upper-limit value for the green-color data value is 2^6−1=63. If the green-color data value g(5:0) is equal to neither 0 nor the upper-limit value for the green-color data value (e.g., 63), control may be transferred to step 504, in which exception logic 102 may provide the modified red-color data value r_mod to display module 126 for displaying the image. If the green-color data value g(5:0) is equal to either 0 or the upper-limit value for the green-color data value (e.g., 63), control may be transferred to step 506.

In step 506, exception logic 120 may determine whether the normalized red-color data value r(5:0) is equal to 0 or is equal to the upper-limit value for the normalized red-color data value. Given that the red-color data is 5-bit and has been multiplied by 2 in the normalization process, the upper-limit value for the normalized red-color data value is 2*(the upper-limit value for the red-color data)=2*(2̂5−1)=62, which is less than the upper-limit value for the green-color data value, 63. If the normalized red-color data value is equal to neither 0 nor the upper-limit value for the normalized red-color data value, control may be transferred to step 504, in which exception logic 102 may provide the modified red-color data value r_mod to display module 126 for displaying the image.

If the normalized red-color data value is equal to 0, control may be transferred to step 508, in which exception logic 120 may provide 0 as the boundary red-color data value r_bound to display module 126 for displaying the image.

If the normalized red-color data value is equal to the upper-limit value for the normalized red-color data value (e.g., 62), control may be transferred to step 510, in which exception logic 120 may provide the upper-limit value for the green-color data value (e.g., 63) as the boundary red-color data value r_bound to display module 126 for displaying the image.

The method illustrated in the example of FIG. 5 ensures that red-color data values reach the lower and upper bounds of the data range of the green-color data, which is the target data range according to the target bit depth for the normalization process. When the normalized red-color data value is 62 and when the corresponding green-color data value is 63, the two values are sufficiently close to each other, and the red-color data value used for displaying image is set to equal to 63, i.e., equal to the corresponding green-color data value. Analogously, when a normalized blue-color data value is at its upper limit and is close to the upper-limit value of its corresponding green-color data value, e.g., 63, the blue-color data value used for displaying image is set to equal to 63, i.e., equal to the corresponding green-color data value. Accordingly, instead of a conspicuous color, grey color is displayed. Advantageously, the likelihood of noticeable chromatic artifacts may be reduced.

In the examples of FIGS. 1-5, color data having the highest bit depth may not need to be normalized, and color data having bit depths lower than the highest bit depth may be normalized according to the highest bit depth. Advantageously, embodiments of the invention may effectively reduce the amount of noticeable chromatic artifacts without unnecessarily consuming computing resource.

In one or more embodiments, for satisfying specific display system design requirements, all input color data may be normalized according to a required target bit depth that is higher than all the bit depths of the input color data. As an example, all of the red-color data, the green-color data, and the blue-color data in a set of RGB565 color data may be normalized according to a 8-bit bit depth, as illustrated in the following example program/code called FIX565, wherein the symbol “—” denotes comments in the code:

```
--BEGIN 565 correction controlled by FIX565 register.
--First an offset of 2 is introduced to the 5-bit signal in order to center it
with the 6-bit green signal.
--Then each of red channel value and blue channel value is shifted (either
up or down) in the direction of green without overshooting the green
value.
--The red and blue channels are shifted up or down according to the
registers: RSHU, RSHD, BSHU, and BSHD.
--When the red/blue values are very close to the green values, they snap to
the green values, resulting in grey.
```

-continued

```
--Setting the shift up/down registers to values greater than 2 will have a
broader snapping effect.
local r_corr, b_corr
local OFFSET = 2 -- (GBITS – RBITS)*2
r_trunc_in = math.floor(r_david_in/(2^(8_RBITS)))*(2^(8_RBITS)) --
Remove the lower 3 Davidson bits
g_trunc_in = math.floor(g_david_in/(2^(8_GBITS)))*(2^(8_GBITS)) --
Remove the lower 2 Davidson bits
b_trunc_in = math.floor(b_david_in/(2^(8_BBITS)))*(2^(8_BBITS)) --
Remove the lower 3 Davidson bits
local r_offset = OFFSET + r_trunc_in
local b_offset = OFFSET + b_trunc_in
local r_david_out, g_david_out, b_david_out
if FIX565 == 1 then
if r_offset > g_trunc_in then
r_corr = math.max( g_trunc_in, r_offset – RSHD )
else
r_corr = math.min( g_trunc_in, r_offset + RSHU )
end
if b_offset > g_trunc_in then
b_corr = math.max( g_trunc_in, b_offset – BSHD )
else
b_corr = math.min( g_trunc_in, b_offset + BSHU )
--Exceptions that force zeros and 252 (which turns into 255 after the
Davidson algorithm)
if r_trunc in == 0 and (g_trunc_in == 0 or g_trunc_in == 252) then
r_corr = 0
end
if r_trunc_in == 248 and (g_trunc_in == 0 or g_trunc_in == 252) then
r_corr = 252
end
if b_trunc_in == 0 and(g_trunc_in == 0 or g_trunc_in == 252) then
b_corr = 0
end
if b_trunc_in == 248 and (g_trunc_in == 0 or g_trunc_in == 252) then
b_corr = 252
end
-- Perform Davidson algorithm
r_david_out = r_corr +rnath.floor(r_c0rrl(2^GBITS)) -- Add only top 2
bits to lower bits (use GBITS)
g_david_out = g_david_in
b_david_out = b_corr +math.floor(b_corr/(2^GBITS))
ri = r_david_out -- Corrected 565 data
gi = g_david_out
bi = b_david_out
spr.store("corr",x,y,bi,gi,ri)
else -- No correction
end -- FIX565
```

In the program/code, r_trunc_in, g_trunc_in, and b_trunc_in represent 8-bit normalized red-color data, 8-bit normalized green-color data, and 8-bit normalized blue-color data, respectively.

In one or more embodiments, Davidson bits (low-importance bits) may be removed and added, as illustrated in the example program/code FIX565.

The example program/code FIX565 may be implemented using hardware circuitry 102 illustrated in the example of FIG. 1.

As can be appreciated from the foregoing, embodiments of the invention may shift the offset color data values that represent relatively-low-bit-depth color data to be locked with high-bit-depth color data values that represent relatively-high-bit-depth color data whenever the offset color data values are sufficiently close to the high-bit-depth color data values. According, instead of conspicuous colors that might have been displayed, grey color may be displayed. Since grey color is generally less conspicuous than other colors, embodiments of the invention may effectively reduce the amount of noticeable chromatic artifacts. Advantageously, embodiments of the invention may provide desirable image quality while satisfying image data size constraints and/or cost constraints.

While this invention has been described in terms of several embodiments, there are alterations, permutations, and equivalents, which fall within the scope of this invention. It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents as fall within the true spirit and scope of the present invention.

What is claimed is:

1. A method for modifying color data in a display system, the method being implemented using hardware circuitry, the method comprising:

receiving, using the hardware circuitry, first-color data associated with a first bit depth, the first-color data including a first-color data value;

receiving, using the hardware circuitry, second-color data associated with a second bit depth, the second-color data including a second-color data value that corresponds to the first-color data value, the second bit depth being less than the first bit depth;

normalizing, using the hardware circuitry, the second-color data according to the first bit depth for generating normalized second-color data;

adding, using the hardware circuitry, a first offset value to each data value of the normalized second-color data to generate offset second-color data, the offset second-color data including an offset second-color data value that corresponds to the first-color data value and the second-color data value;

determining a modified second-color data value using the hardware circuitry, the first-color data value, and the offset second-color data value; and providing the first-color data value and the modified second-color data value for displaying an image.

2. The method of claim 1 further comprising:

comparing, using the hardware circuitry, the offset second-color data value with the first-color data value;

setting, using the hardware circuitry, the modified second-color data value equal to a maximum value of the first-color data value and a first adjusted second-color data value if the offset second-color data value is greater than the first-color data value, the first adjusted second-color data value being equal to the offset second-color data value minus a first shift value; and setting, using the hardware circuitry, the modified second-color data value equal to a minimum value of the first-color data value and a second adjusted second-color data value if the offset second-color data value is not greater than the first-color data value, the second adjusted second-color data value being equal to the offset second-color data value plus a second shift value.

3. The method of claim 2 further comprising determining, using the hardware circuitry, the first shift value based on the offset second-color data value.

4. The method of claim 2 further comprising:

setting, using the hardware circuitry, the first shift value equal to a first amount if the offset second-color data value equals to a first offset second-color data value; and setting, using the hardware circuitry, the first shift value equal to a second amount if the offset second-color data value equals to a second offset second-color data value, wherein the first offset second-color data value is greater than the second offset second-color data value, and the first amount is less than the second amount.

5. The method of claim 2 further comprising:

setting, using the hardware circuitry, the first shift value equal to a first amount if the offset second-color data value is greater than an threshold; and setting, using the hardware circuitry, the first shift value equal to a second amount if the offset second-color data value is not greater than the threshold, wherein the first amount is less than the second amount.

6. The method of claim 2 further comprising implementing, using the hardware circuitry, the first shift value as a function of the offset second-color data value, wherein the first shift value is inversely proportional to the offset second-color data value.

7. The method of claim 2 further comprising determining, using the hardware circuitry, the first shift value before generating the offset second-color data value.

8. The method of claim 2 further comprising setting, using the hardware circuitry, the first shift value equal to the second shift value.

9. The method of claim 2 further comprising:

receiving, using the hardware circuitry, third-color data associated with a third bit depth, the third-color data including a third-color data value that corresponds to the first-color data value and the second-color data value, the third bit depth being less than the first bit depth;

normalizing, using the hardware circuitry, the third-color data according to the first bit depth for generating normalized third-color data;

adding, using the hardware circuitry, a second offset value to each data value of the normalized third-color data to generate offset third-color data, the offset third-color data including an offset third-color data value that corresponds to the first-color data value and the third-color data value;

determining a modified third-color data value using the hardware circuitry, the first-color data value, and the offset third-color data value; and providing the modified third-color data value for displaying the image.

10. The method of claim 9 further comprising:

comparing, using the hardware circuitry, the offset third-color data value with the first-color data value;

setting, using the hardware circuitry, the modified third-color data value equal to a maximum value of the first-color data value and a first adjusted second-color data value if the offset third-color data value is greater than the first-color data value, the first adjusted third-color data value being equal to the offset third-color data value minus a third shift value; and setting, using the hardware circuitry, the modified third-color data value equal to a minimum value of the first-color data value and a third adjusted second-color data value if the offset second-color data value is not greater than the first-color data value, the second adjusted third-color data value being equal to the offset third-color data value plus a fourth shift value.

11. The method of claim 10 further comprising setting, using the hardware circuitry, the third shift value equal to the first shift value.

12. The method of claim 10 further comprising determining, using the hardware circuitry, the third shift value based on the offset third-color data value such that the third shift value is not equal to the first shift value.

13. The method of claim 1 wherein the first-color data further includes a second first-color data value, the second-color data further includes a second second-color data value corresponding to the second first-color data value, and the method further comprises:

determining a boundary second-color data value using the hardware circuitry, the second first-color data value and the second second-color data value; and providing the second first-color data value and the boundary second-color data value for displaying the image.

14. The method of claim 13 further comprising:

setting, using the hardware circuitry, the boundary second-color data value equal to 0 if the second second-color data value equals to 0 and if the second first-color data value equals to 0 or a maximum possible value for the second first-color data value;

setting, using the hardware circuitry, the boundary second-color data value equal to the upper-limit value for the second first-color data value if the second second-color data value equals to an upper-limit normalized value for the second second-color data value and if the second first-color data value equals to 0 or the maximum value for the second first-color data value, wherein the upper-limit normalized value for the second second-color data value is less than the upper-limit value for the second first-color data value.

15. The method of claim 1 further comprising setting, using the hardware circuitry, the first offset value equal to 2 times a difference between the first bit depth and the second bit depth.

16. The method of claim 1 further comprising normalizing, using the hardware circuitry, input first-color data according to the first bit depth for generating the first-color data, the input first-color data being associated with a third bit depth that is less than the first bit depth.

17. The method of claim 1 further comprising:

receiving, using the hardware circuitry, third-color data associated with a third bit depth, the third-color data including a third-color data value that corresponds to the first-color data value and the second-color data value, the third bit depth being less than the first bit depth;

normalizing, using the hardware circuitry, the third-color data according to the first bit depth for generating normalized third-color data;

adding, using the hardware circuitry, a second offset value to each data value of the normalized third-color data to generate offset third-color data, the offset third-color data including an offset third-color data value that corresponds to the first-color data value and the third-color data value;

determining a modified third-color data value using the hardware circuitry, the first-color data value, and the offset third-color data value; and displaying the image further using the modified third-color data value.

18. The method of claim 17 wherein the third bit depth is equal to the second bit depth.

19. The method of claim 17 wherein the third bit depth is not equal to the second bit depth.

20. A display system comprising:

hardware circuitry comprising:

logic for receiving first-color data associated with a first bit depth, the first-color data including a first-color data value, logic for receiving second-color data associated with a second bit depth, the second-color data including a second-color data value that corresponds to the first-color data value, the second bit depth being less than the first bit depth, logic for normalizing the second-color data according to the first bit depth for generating normalized second-color data, logic for adding a first offset value to each data value of the normalized second-color data to generate offset second-color data, the offset second-color data including an offset second-color data value that corresponds to the first-color data value and the second-color data value, and logic for determining a modified second-color data value using the first-color data value, and the offset second-color data value; and a display module displaying an image using the first-color data value and the modified second-color data value.

* * * * *